(12) United States Patent
Daudelin et al.

(10) Patent No.: US 11,250,576 B2
(45) Date of Patent: Feb. 15, 2022

(54) SYSTEMS AND METHODS FOR ESTIMATING DYNAMICS OF OBJECTS USING TEMPORAL CHANGES ENCODED IN A DIFFERENCE MAP

(71) Applicant: Toyota Research Institute, Inc., Los Altos, CA (US)

(72) Inventors: Jonathan A. Daudelin, Ann Arbor, MI (US); Matthew T. Kliemann, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 217 days.

(21) Appl. No.: 16/543,893

(22) Filed: Aug. 19, 2019

(65) Prior Publication Data

US 2021/0056712 A1 Feb. 25, 2021

(51) Int. Cl.
  *G06T 7/246* (2017.01)
  *G06K 9/00* (2006.01)
(52) U.S. Cl.
  CPC .......... *G06T 7/248* (2017.01); *G06K 9/00805* (2013.01); *G06T 2207/30261* (2013.01)
(58) Field of Classification Search
  None
  See application file for complete search history.

(56) References Cited

U.S. PATENT DOCUMENTS

| | | | |
|---|---|---|---|
| 8,588,472 B2 | 11/2013 | Borman et al. | |
| 8,948,501 B1 | 2/2015 | Kim et al. | |
| 8,977,007 B1 | 3/2015 | Ferguson et al. | |
| 9,111,444 B2 | 8/2015 | Kaganovich | |
| 9,329,269 B2 | 5/2016 | Zeng | |
| 9,383,753 B1 | 7/2016 | Templeton et al. | |
| 2008/0009966 A1* | 1/2008 | Bruemmer | G06N 3/008 700/245 |
| 2010/0034422 A1 | 2/2010 | James et al. | |
| 2011/0255741 A1 | 10/2011 | Jung et al. | |

(Continued)

OTHER PUBLICATIONS

Shakleton et al. Tracking People with a 360-Degree Lidar, Advanced Video and Signal Based Surveillance, IEEE Conference on. 420-426. 10.1109/AVSS.2010.52. (2010).

(Continued)

*Primary Examiner* — Matthew C Bella
*Assistant Examiner* — Brian D Shin
(74) *Attorney, Agent, or Firm* — Christopher G. Darrow; Darrow Mustafa PC

(57) ABSTRACT

System, methods, and other embodiments described herein relate to tracking dynamic objects in a surrounding environment of a vehicle. In one embodiment, a method includes, in response to acquiring sensor data from at least one sensor, generating a current occupancy map that indicates locations of occupied grid cells as identified by the sensor data. The method includes updating a difference map according to the current occupancy map. The difference map encodes temporal changes in relation to prior states of occupancy of the grid cells to track dynamic objects in the surrounding environment over a defined temporal horizon. The method includes computing dynamics of the dynamic objects according to the difference map. The method includes providing the dynamics to at least one vehicle system within the vehicle.

20 Claims, 6 Drawing Sheets

(56) References Cited

U.S. PATENT DOCUMENTS

| | | | |
|---|---|---|---|
| 2011/0317877 A1* | 12/2011 | Bell | G06K 9/2054 |
| | | | 382/103 |
| 2014/0058610 A1* | 2/2014 | Sofman | B25J 9/0003 |
| | | | 701/23 |
| 2014/0368493 A1 | 12/2014 | Rogan et al. | |
| 2015/0356454 A1* | 12/2015 | Zeng | G01S 7/4808 |
| | | | 703/2 |

OTHER PUBLICATIONS

Nikdel et al. Recognizing and Tracking High-Level, Human-Meaningful Navigation Features of Occupancy Grid Maps found at: arXiv:1903.03669v1 [cs.RO] Mar. 8, 2019.

* cited by examiner

SYSTEMS AND METHODS FOR ESTIMATING DYNAMICS OF OBJECTS USING TEMPORAL CHANGES ENCODED IN A DIFFERENCE MAP

TECHNICAL FIELD

The subject matter described herein relates, in general, to estimating dynamics of objects, and, more particularly, to encoding temporal changes within a single difference map from which evidence of motion may be derived.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. Different vehicle systems may use this sensor data for perceiving the noted objects and performing various actions such as obstacle detection/avoidance, etc.

In general, the further awareness is developed by the vehicle about a surrounding environment, the better a driver can be supplemented with information to assist in driving and/or the better an autonomous/semi-autonomous system can control the vehicle to avoid hazards. However, the sensor data acquired by the various sensors generally includes some amount of error and/or noise. The errors/noise can cause difficulties with distinguishing between moving objects. For example, the errors/noise that are present in the sensor data can obstruct observations of certain objects, generate aberrations in the data that result in the appearance of static objects (e.g., vegetation) moving, and so on.

Moreover, analyzing the sensor data to produce the determinations can involve storing a plurality of full frames of data including full point clouds of a surrounding environment that are each then compared point-by-point to identify differences between each successive frame. However, this approach to differencing is computationally intensive since requirements for storing and processing the frames can be extensive, and impractical, especially for a mobile platform such as a vehicle. Therefore, issues with perceiving a surrounding environment and developing accurate situational awareness persist.

SUMMARY

Example systems and methods disclosed herein relate to estimating velocities of objects using a difference map encoded with temporal changes. In one or more embodiments, a disclosed approach efficiently handles large quantities of sensor data by selectively storing relevant aspects of the data while discarding other aspects. For example, in one aspect, a disclosed system may collect sensor data from one or more sensors (e.g., LiDAR) at regular intervals as a basis for assessing the surrounding environment. Accordingly, the system can use the sensor data to generate a current occupancy map of the surrounding environment of the vehicle or other device for which the system is acting. The occupancy map defines a grid within a coordinate system around the vehicle where cells in the grid indicate a state of that particular location in the surrounding environment. For example, the system may generate the occupancy map to indicate three separate states: free/unoccupied, occupied, or unknown. The system uses information from the sensor data to determine the states and populates the occupancy map/grid according to the states thereby relating useful information from the sensor data into a more condensed form in the occupancy map.

Moreover, the disclosed system can then use the occupancy map to update a difference map that encodes temporal changes about the surrounding environment. For example, the difference map generally correlates with the occupancy map but encodes changes in states of grid cells instead of encoding a full occupancy mapping at each iteration of the sensor data. The temporal changes, in one approach, identify when a grid cell changes from unoccupied to occupied, or from occupied to unoccupied. Thus, the temporal changes generally serve as evidence of motion within the surrounding environment by some dynamic object.

The system may update the difference map through, for example, a direct comparison of the occupancy map with the difference map, and separately encoding the grid cells in the difference map to identify the temporal changes. Moreover, encoding the difference map with the temporal changes generally involves identifying when a temporal change occurred and where the change occurred. Thus, at each separate iteration of updating the difference map, the system can indicate that a change is new and increment ages of prior encoded changes to retain a mapping of the changes from prior comparisons and intrinsically encode relationships therebetween. In this way, the system encodes information about positions and movements of objects in the surrounding environment into a single difference map that is compact and more efficient than retaining sets of sensor data or separate mappings.

Subsequently, the system leverages the information in the difference map as evidence of motion to compute dynamics for the surrounding environment. That is, the system associates occupied grid cells with temporal changes from multiple prior iterations in order to identify consistent motion of the objects occupying the grid cells. In general, the temporal changes indicate previous locations of the objects. Therefore, using the information about the temporal changes (e.g., location/distance, timing), the system can estimate the dynamics (e.g., current velocity, acceleration, etc.) and may further predict a future position of the objects according to the dynamics. In this way, the system uses the difference map to efficiently encode temporal changes and improve situational awareness of the vehicle by estimating dynamics of the surrounding environment.

In one embodiment, a tracking system for tracking dynamic objects in a surrounding environment of a vehicle is disclosed. The system includes one or more processors and a memory communicably coupled to the one or more processors. The memory stores an input module including instructions that when executed by the one or more processors cause the one or more processors to, in response to acquiring sensor data from at least one sensor, generate a current occupancy map that indicates locations of occupied grid cells as identified by the sensor data. The memory stores a tracking module including instructions that when executed by the one or more processors cause the one or more processors to update a difference map according to the current occupancy map. The difference map encodes temporal changes in relation to prior states of occupancy of the grid cells to track dynamic objects in the surrounding environment over a defined temporal horizon. The tracking module includes instructions to compute dynamics of the dynamic objects according to the difference map.

In one embodiment, a non-transitory computer-readable medium for tracking dynamic objects in a surrounding environment of a vehicle and including instructions that when executed by one or more processors cause the one or more processors to perform one or more functions is disclosed. The instructions include instructions to, in response to acquiring sensor data from at least one sensor, generate a current occupancy map that indicates locations of occupied grid cells as identified by the sensor data. The instructions include instructions to update a difference map according to the current occupancy map. The difference map encodes temporal changes in relation to prior states of occupancy of the grid cells to track dynamic objects in the surrounding environment over a defined temporal horizon. The instructions include instructions to compute dynamics of the dynamic objects according to the difference map. The instructions include instructions to provide the dynamics to at least one vehicle system within the vehicle.

In one embodiment, a method for tracking dynamic objects in a surrounding environment of a vehicle is disclosed. In one embodiment, the method includes, in response to acquiring sensor data from at least one sensor, generating a current occupancy map that indicates locations of occupied grid cells as identified by the sensor data. The method includes updating a difference map according to the current occupancy map. The difference map encodes temporal changes in relation to prior states of occupancy of the grid cells to track dynamic objects in the surrounding environment over a defined temporal horizon. The method includes computing dynamics of the dynamic objects according to the difference map. The method includes providing the dynamics to at least one vehicle system within the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
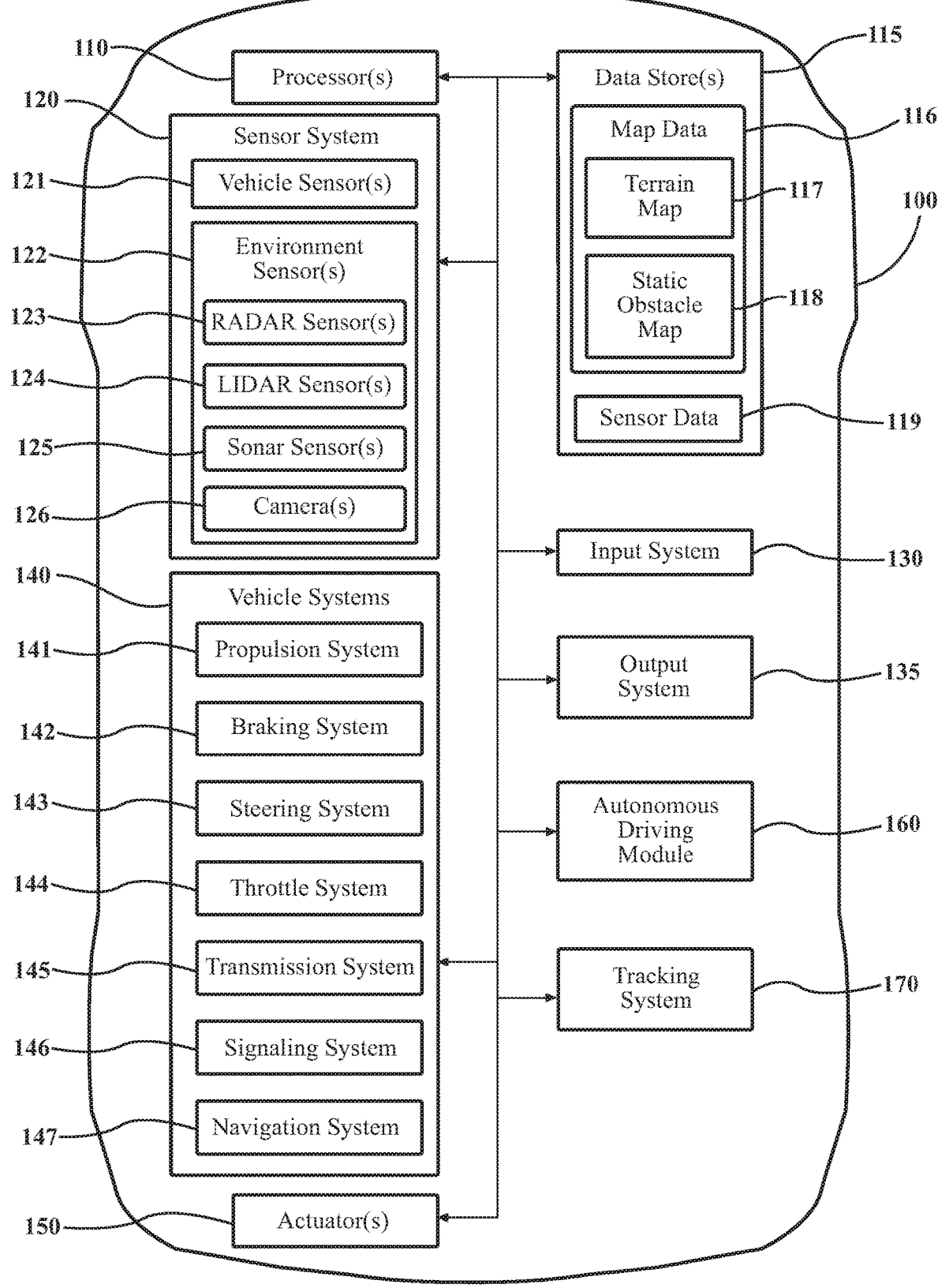
FIG. 1 illustrates one embodiment of a vehicle within which systems and methods disclosed herein may be implemented.

Systems, methods, and other embodiments associated with estimating velocities of objects using a difference map to encode temporal changes are disclosed. As previously noted, various devices such as vehicles use LiDAR and other sensors to perceive a surrounding environment. However, the vehicles may encounter difficulties in perceiving motion of certain objects because of aberrations/errors that develop in the sensor data. Moreover, various approaches to tracking can be inefficient and impractical for mobile platforms such as vehicles due to computational requirements, as previously outlined.

Therefore, in one embodiment, a tracking system improves the tracking of dynamic objects by encoding a difference map with temporal changes to more efficiently track the objects in a surrounding environment. For example, the tracking system improves data handling and determinations about dynamics for the surrounding environment by selectively storing relevant determinations from the sensor data while discarding redundant and other unused aspects of the data.

In one embodiment, the tracking system collects the sensor data from at least one sensor (e.g., a LiDAR) embedded within the vehicle. The tracking system collects the data iteratively to capture a representation of the surrounding environment that facilitates maintaining situational awareness about objects around the vehicle. From the sensor data, the system may generate a current occupancy map at each timestep/iteration. The occupancy map defines a grid including a plurality of cells within a coordinate system around the vehicle where the cells indicate a state of that particular location in the surrounding environment. The tracking system uses information from the sensor data to determine the states of the grid cells and populates the occupancy map/grid according to the states thereby relating useful information from the sensor data into a more condensed form in the occupancy map. For example, the tracking system may generate the occupancy map to indicate three separate states: free/unoccupied, occupied, or unknown, thereby relating the presence of an object without providing the actual sensor data.

The grid cells are generally ¼ meter square, but may be a different size depending on the implementation. Additionally, the grid cells may be provided as two-dimensional or three-dimensional representations of a corresponding space in the environment, and, thus, the cells may be represented as pixels or voxels depending on the implementation. The tracking system may further transform each acquisition of the sensor data into a defined coordinate space to compensate for motion of the vehicle and ensure the current occupancy grid accurately aligns with a difference map.

In either case, the disclosed system can then use the occupancy map to update the difference map that encodes temporal changes about the surrounding environment. For example, the difference map spatially correlates with the occupancy map but encodes changes in states of grid cells instead of encoding a full occupancy mapping at each iteration of the sensor data. The temporal changes, in one approach, identify when a grid cell changes from unoccupied to occupied, or from occupied to unoccupied. Thus, the temporal changes generally serve as evidence of motion within the surrounding environment from which the system can determine various information.

Thus, in one approach, the system updates the difference map through, for example, a comparison of the occupancy map with the difference map. The system separately encodes the grid cells in the difference map to identify the temporal changes identified via the comparison. That is, when the difference map indicates a grid cell was previously occupied and the occupancy is no longer present in the current occupancy map, then the system identifies the change to a free space in the difference map. Similarly, the tracking system encodes newly occupied grid cells into the difference map.

Moreover, encoding the difference map with the temporal changes generally involves identifying when a temporal change occurred. Thus, at each separate update iteration, the system encodes new changes into the map and increments ages of previously encoded changes to retain a mapping of the changes from prior comparisons. In this way, the system intrinsically encodes information about positions and movements of objects in the surrounding environment into a single difference map that is compact and more efficient than retaining multiple sets of sensor data or separate mappings.

Subsequently, the system leverages the information in the difference map as evidence of motion to compute dynamics for the surrounding environment. That is, the system associates occupied grid cells with temporal changes from multiple prior iterations in order to identify prior motion of the objects occupying the grid cells. In general, the temporal changes indicate previous locations of the objects. Therefore, using the information about the temporal changes (e.g., location/distance, timing), the system can estimate the dynamics (e.g., current velocity, acceleration, etc.) and may further predict a future position of the objects according to the dynamics. In this way, the system uses the difference map to efficiently encode temporal changes and leverage the encoded information to improve situational awareness of the vehicle by accurately estimating dynamics of the surrounding environment.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles, but embodiments are discussed in relation to automobiles as one example of a device that benefits from the presently disclosed approach. In some implementations, the vehicle 100 may be any form of transport that, for example, includes one or more sensors and an associated automated system as outlined herein, and thus benefits from the functionality discussed herein.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services). That is, in one or more approaches, the vehicle 100 may include one or more modules of the tracking system 170 while other modules are embodied in a cloud-computing environment or as a remote server entity.

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements. In either case, as illustrated, the vehicle 100 includes a tracking system 170 that functions to identify and track (e.g., estimate dynamics) moving objects in a surrounding environment as will become apparent with the discussion of the subsequent figures.

Figure 2:
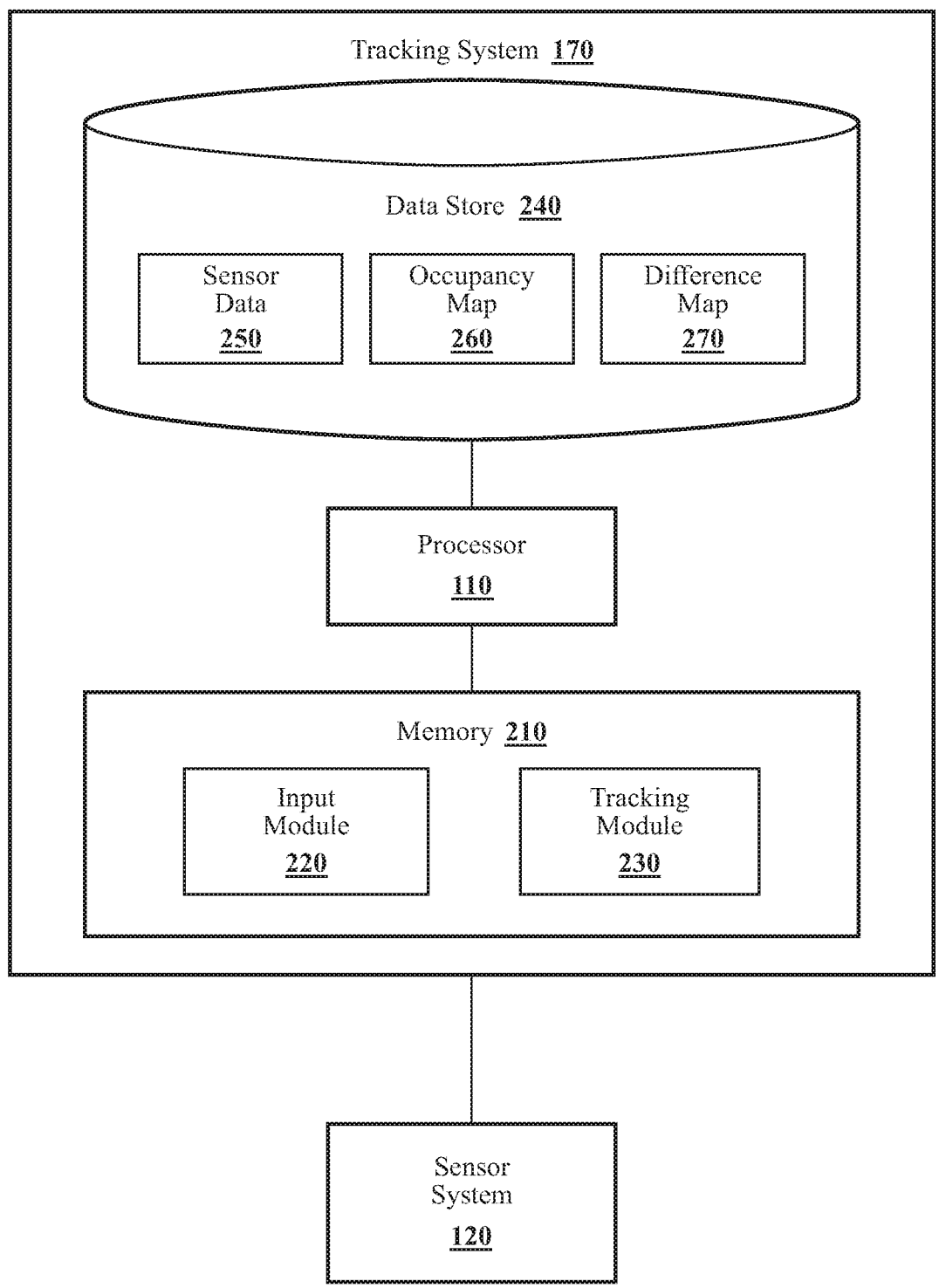
FIG. 2 illustrates one embodiment of a tracking system that is associated with encoding temporal changes within a difference map to track dynamic objects.

With reference to FIG. 2, one embodiment of the tracking system 170 is further illustrated. As shown, the tracking system 170 includes a processor 110. Accordingly, the processor 110 may be a part of the tracking system 170 or the tracking system 170 may access the processor 110 through a data bus or another communication path. In one or more embodiments, the processor 110 is an application-specific integrated circuit that is configured to implement functions associated with an input module 220 and a tracking module 230. In general, the processor 110 is an electronic processor such as a microprocessor or other processing circuitry that is capable of performing various functions as described herein when implemented in combination with the noted instructions and/or modules.

In one embodiment, the tracking system 170 includes a memory 210 that stores the input module 220 and the tracking module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. In one or more embodiments, the modules 220 and 230 are embedded in an on-chip memory of the processor 110.

Furthermore, in one embodiment, the tracking system 170 includes a data store 240. The data store 240 is, in one embodiment, an electronic data structure such as a database that is stored in the memory 210 or separately in another memory and that is configured with routines that can be executed by the processor 110 for analyzing stored data, providing stored data, organizing stored data, and so on. Thus, in one embodiment, the data store 240 stores data used by the modules 220 and 230 in executing various functions. Accordingly, in at least one configuration, the data store 240 electronically stores sensor data 250, occupancy map 260, and difference map 270 along with, for example, other information that is used by the modules 220 and 230.

Accordingly, the input module 220 generally includes instructions that function to control the processor 110 to acquire data inputs from one or more sensors of the vehicle 100 (e.g., sensor system 120) that form sensor data 250. The sensor data 250 embodies observations of the surrounding environment of the vehicle 100 including at least surrounding lanes and nearby regions (e.g., sidewalks) that include any vehicles, pedestrians, or other objects that may be present in the noted areas. The present discussion will focus on acquiring the sensor data 250 using a LiDAR 124, but it should be appreciated that the sensor data 250 may include observations from multiple sensors of the vehicle 100 including, for example, radar 123, camera 126, and so on. Additionally, it should be appreciated that the disclosed approach can be extended to cover further configurations of sensors such as LiDAR sensors with one or more cameras, different types of LiDARs and cameras, combinations of radars and cameras, sonar, or other sensors.

The input module 220, in one embodiment, controls the respective sensors to iteratively provide the data inputs in the form of the sensor data 250. Additionally, while the input module 220 is discussed as controlling the various sensors to provide the sensor data 250, in one or more embodiments, the input module 220 can employ other techniques to acquire the sensor data 250 that are either active or passive. For example, the input module 220 may passively sniff the sensor data 250 from a stream of electronic information provided by the various sensors to further components within the vehicle 100 over a bus (e.g., CAN bus). Moreover, as previously indicated, the input module 220 can undertake various approaches to fuse data from multiple sensors when providing the sensor data 250. Thus, the sensor data 250, in one embodiment, represents a combination of measurements acquired from multiple sensors.

The sensor data 250 itself generally provides relative measurements between the vehicle 100 and surrounding objects (whether explicit or derived via intermediate processing) in order to identify occupied space in the surrounding environment. Moreover, the input module 220, in one embodiment, controls the sensors to acquire the sensor data 250 about an area that encompasses 360 degrees about the vehicle 100 in order to provide a comprehensive assessment of the surrounding environment. Furthermore, the sensor data 250 can include 3D point cloud data, camera images and/or video from the camera 126, radar measurements, and so on. As such, the input module 220 may acquire the sensor data 250 as integrated frames of information, which may be three-dimensional or two-dimensional depending on the configuration of sensors providing the sensor data 250. Additionally, further attributes of the sensor data 250 such as observation distances (i.e., distance from the vehicle to which the sensor can sufficiently resolve information), intervals/periods between observations, cell size, and other attributes generally vary according to implementation characteristics such as sensor versions, processing abilities, and so on.

In any case, the input module 220 uses the sensor data 250 to generate the current occupancy map 260. In one embodiment, the input module 220 generates the occupancy map 260 at each timestep, which is generally each acquisition of the sensor data 250. The system 170 may define the timesteps in relation to characteristics of one or more sensors, according to a desired resolution of temporal changes, according to processing capabilities of the system 170 and/or the vehicle 100, and so on. In either case, the input module 220 generates the current occupancy map 260, in one or more approaches, at regular intervals. The input module 220 analyzes the sensor data 250 to identify occupied locations in the surrounding environment in relation to a defined network of grid cells that comprise the occupancy map 260.

For example, the occupancy map 260 generally defines a coordinate system about the vehicle 100. In a simplest form, the occupancy map 260 is a 2D grid from an overhead perspective of the surroundings of the vehicle 100 with the grid cells defined according to, for example, separate reference axes for longitude and latitude. The grid cells themselves have a defined size (e.g., 0.25 m$^2$) that the system 170 defines according to various implementation characteristics such as sensor resolution, a size of objects being tracked, memory size, etc. In any case, the input module 220 correlates the sensor data 250 with the grid cells to determine whether the respective cells in the map 260 are unoccupied/free or occupied.

In a further aspect, the input module 220 may also determine whether a grid cell is occluded. In one aspect, the input module 220 uses ray tracing to determine when occupied cells occlude a view of other grid cells from a perspective of an observing sensor. Accordingly, the input module 220 generates the occupancy map 260 (also referred to as an occupancy grid) with consideration to a perspective of the sensor in relation to occupied grid cells. That is, in one approach, after identifying cells that are unoccupied/free and occupied, the input module 220 performs a ray-tracing procedure to determine which cells are occluded. Accordingly, cells that are behind occupied cells from a perspective of the observing sensor may be defined as occluded/unknown according to this process. In this way, the input module 220 can generate the occupancy map 260 with one of three separate states for each grid cell—occupied, unoccupied/free, and occluded/unknown.

Moreover, it should be appreciated that the input module 220 maintains consistency between determinations for individual cells across successive iterations of the occupancy map 260 even though a platform of the observing sensor(s) is moving (i.e., the vehicle 100). Thus, the input module 220 may undertake an adjustment or registration at each timestep to ensure that the current occupancy map 260 accurately aligns with prior observations embodied in the difference map 270.

Continuing with FIG. 2, in one embodiment, the tracking module 230 includes instructions that when executed by the processor 110 cause the processor 110 to update the difference map 270 according to the current occupancy map 260. The tracking module 230 implements the difference map 270 to encode temporal changes in relation to prior states of occupancy of the grid cells. The encoding of this information in the difference map 270 permits the tracking module 230 to track dynamic objects (e.g., estimate velocities) in the surrounding environment over a defined temporal horizon.

For example, in one approach, after the input module 220 generates the current occupancy map 260, the tracking module 230 proceeds to analyze the occupancy map 260 in relation to the difference map 270. That is, the tracking module 230 compares prior encoded state changes (i.e., temporal changes) with the information encoded in the occupancy map 260 to identify current temporal changes in the surrounding environment. For example, consider that information encoded in the difference map 270 indicates one of two possible states including previously added and previously removed. The grid cells in the difference map 270, thus, indicate changes in the state of a grid cell and also indicate when the change occurred. The grid cells define when a cell changed from occupied to free/unoccupied or unoccupied to occupied. As such, the difference map 270 includes an indicator of the state change and an age of the state change. The age is an indication of between which prior frames (i.e., prior acquisitions of the sensor data 250) the tracking module 230 identified the change as occurring. Thus, the tracking module 230 can encode the age as a simple number indicating how many iterations before the present iteration the change took place (e.g., 1—immediately prior iteration, 2—two iterations prior, etc.) or as another encoding (e.g., color, etc.).

Accordingly, the tracking module 230, in one or more approaches, updates the difference map 270 by comparing the occupancy map 260 cell-by-cell to the difference map 270 to identify transitions in state from unoccupied/free to occupied and occupied to unoccupied/free in relation to the temporal changes encoded in the map 270. As an additional note, for cells in the occupancy map 260 that indicate occluded/unknown, the tracking module 230 takes no action (except incrementing an age when appropriate) since whether the state of the encoding in the difference map has changed cannot be determined when the cell is presently occluded.

It should be appreciated that even though the difference map 270 encodes temporal changes as opposed to simple occupancies, the temporal changes inherently describe a current state of the grid cells while also indicating when the cells changed state. Thus, the tracking module 230 performs the comparison to identify whether any grid cells have presently changed and encodes the changes into the difference map 270 including an age indicator that specifies the change as new.

In further aspects, this process of comparing the occupancy grid 260 with the difference map 270 may be referred to as frame differencing, which generally entails finding differences between two successive frames (i.e., observations of the surrounding environment). In other words, cells that are occupied in a preceding frame and are free/unoccupied in a present frame are subtracted from the present frame, and that information is recorded in a cell. Additionally, the frame differencing process further records points/cells that have been added in the present frame and were free/unoccupied in the preceding frame as newly occupied cells.

As implemented herein, the tracking module 230 can encode the grid cells in the difference map 270 in different ways including using numeric values, alphanumeric codes, different colors, and so on. By way of example, the tracking module 230 may encode cells in red to signify cells that have been deleted (i.e., previously occupied but now unoccupied) and have a "delete age" of 1, green to signify cells that have been added (i.e., previously unoccupied/free and now occupied) and have an "add age" of 1. In other words, red pixels would identify occupied cells from the preceding frame but are now unoccupied in the present frame while the green pixels identify cells that were unoccupied in the preceding frame but are now occupied in the present frame.

As previously noted, the tracking module 230 maintains the difference map 270 out to a defined temporal horizon (e.g., 2 seconds prior), which generally includes multiple updating iterations (e.g., every 0.1 seconds). Thus, the tracking module 230, in one or more approaches, also updates the ages of the temporal changes with each subsequent update to apply this encoding structure over a series of consecutive frames where cells/pixels indicate in which frame a cell was added or deleted (e.g., when a temporal change occurred). The tracking module 230 can change color encodings according to age and encoding type. Thus, continuing the example, the tracking module 230 encodes green pixels to signify cells added in the present frame that were unoccupied in a frame one timestep prior to the present frame, and have an "add age" of 1, blue pixels for cells added in the frame one timestep prior to the present frame, but that were unoccupied in a frame two timesteps prior to the present frame, having an "add age" of 2. Additionally, further encodings can include red pixels to signify cells added in the frame two timesteps prior to the present frame, but that were not occupied in a frame three timesteps prior to the present frame, having an "add age" of 3, and so on.

Accordingly, the tracking module 230 functions to encode the difference map 270 as a memory window, storing a defined number of frame differences embodied by the encoded temporal changes. In such a case, the difference map 270 stores the differences (i.e., temporal changes) between each two successive frames within a predetermined number of frames defining the temporal horizon. The tracking module 230 produces the difference map 270 as evidence that objects are moving as correlated by clusters of similarly encoded grid cells (e.g., similarly colored pixels) over two or more iterations.

The tracking module 230 may further undertake a process of computing dynamics for different types of objects (e.g., cars, pedestrians, etc.) that relies on a different number of encoded frames in the map 270 depending on the type/class of object. For example, while larger objects such as vehicles generally provide a greater amount of evidence in each frame (i.e., more grid cells with detected changes), smaller objects may provide few cells with temporal changes in each frame. Thus, the tracking module 230, in one embodiment, may provide identifications of larger objects (e.g., vehicles) within two update iterations, while providing identifications from the difference map 270 of smaller objects (e.g., pedestrians) in six frames.

Continuing with the discussion of the tracking module 230, in one embodiment, the tracking module 230 includes instructions to compute dynamics of objects in the surrounding environment from the difference map 270. Accordingly, in one approach, the tracking module 230 associates temporal changes with presently occupied grid cells to provide information about prior positions at previous timesteps from which the tracking module 230 can estimate a current velocity. For example, knowing positions at different time steps from, for example, temporal changes indicating an occupied to unoccupied change generally identifies a tailing portion of an object and provides adequate information (e.g., distance and time) from which the tracking module 230 estimates the current velocities.

As further explanation, in one approach, the tracking module 230 performs motion classification over the difference map 270 using a search-based algorithm to propose a discrete set of candidate velocities. For a proposed candidate velocity, the tracking module 230 shifts all cells in the difference map 270 by the candidate velocity as a function of associated add/delete ages (i.e., the age is multiplied by the candidate velocity to shift cells from previous timesteps). The tracking module 230 compares the positioning of the shifted cells to occupied cells, to collect evidence that a currently occupied cell is associated with a history of temporal changes in the map 270 (i.e., added or deleted cells). This correlation serves as evidence of, for example, consistent motion for an object associated with the occupied cells. Generally speaking, the greater number of shifted cells that correspond to a currently occupied cell, the more evidence that the related cell is moving at the estimated velocity.

In one approach, the tracking module 230 computes the candidate/estimated velocities, using information about distances between grid cells (i.e., previously occupied cells and presently occupied cells), current positions/occupied cells, and timing between iterations. Moreover, the tracking module 230 may generate a heat map of evidence about motion in the surrounding environment to further identify dynamic objects and illustrate the correspondence between the temporal changes and the occupied cells.

In any case, the tracking module 230 can estimate dynamics (e.g., velocity, acceleration, paths) from the difference map 270 to improve a situational awareness of the vehicle 100 about the surrounding environment. In still a further aspect, the tracking module 230 can also predict future positions of the objects according to the determined dynamics and associated paths/trajectories in the environment. For example, in one embodiment, the tracking module 230 extrapolates the future position from the estimated velocity, and a current heading of the objects. In still a further approach, the tracking module 230 predicts future positions/trajectories using a more complex approach such as applying a cubic spline interpolation or another appropriate interpolation.

Furthermore, the tracking module 230 can then use the predicted position/trajectory at subsequent updates to verify prior predictions. That is, once the tracking module 230 generates a position or trajectory prediction, the tracking module 230 can use the prediction at a subsequent timestep in comparison with actual occupancy information (i.e., the occupancy map 260) to confirm the prediction and determine an amount of error between the prediction and the actual position. The tracking module 230 can then use the error and/or other information about the comparison to improve the prediction subsequently. In this way, the tracking system 170 encodes and uses the difference map 270 to improve determinations about dynamic objects in the surrounding environment thereby improving overall object perception by the vehicle 100 and various systems therein that use the generated dynamics information.

Figure 3:
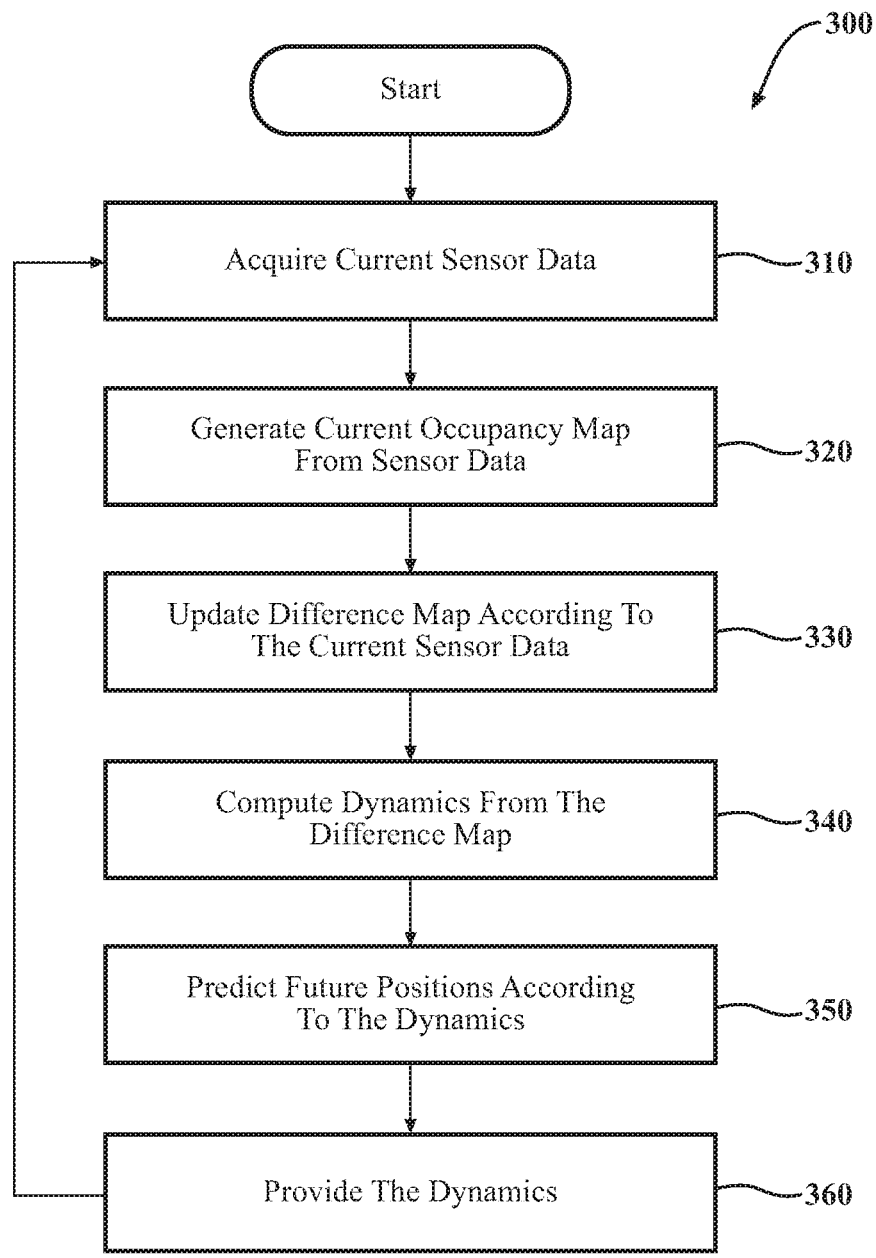
FIG. 3 is a flowchart illustrating one embodiment of a method associated with tracking dynamic objects using a difference map.

As a further explanation of how the present approach provides for distributed updates consider FIG. 3, which illustrates one embodiment of a method 300 associated with using a difference map to track dynamic objects. Method 300 will be discussed from the perspective of the tracking system 170 of FIGS. 1-2. While method 300 is discussed in combination with the tracking system 170, it should be appreciated that the method 300 is not limited to being implemented within the tracking system 170 but is instead one example of a system that may implement the method 300. Moreover, while FIG. 3 illustrates the flowchart of method 300 in a serial manner, it should be appreciated that one or more of the noted functions may execute in parallel.

At 310, the input module 220 controls the sensor system 120 to acquire the sensor data 250. In one embodiment, the input module 220 controls, for example, the LiDAR sensor 124 of the vehicle 100 to observe the surrounding environment. Alternatively, or additionally, the input module 220 controls the camera 126 and the radar 123 or another set of sensors to acquire the sensor data 250. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the input module 220, in one embodiment, controls the sensors to acquire the sensor data 250 of the surrounding environment. As a further note, the sensor data 250 may generally take the form of a point cloud from LiDAR, stereo cameras, a monocular camera, radar, sonar, etc. Thus, the sensor data 250 is generally envisioned as data representing a 3D space and thus may take the form of voxels or other 3D representations. However, in further aspects, the sensor data 250 may alternatively be provided in a 2D format.

Moreover, in further embodiments, the input module 220 controls the sensors to acquire the sensor data 250 at successive iterations or time steps. Thus, the tracking system 170, in one embodiment, iteratively executes the functions discussed at blocks 310-360 to acquire the sensor data 250 and provide information therefrom. Furthermore, the input module 220, in one embodiment, executes one or more of the noted functions in parallel for separate observations in order to maintain updated perceptions. Additionally, as previously noted, the input module 220, when acquiring data from multiple sensors, fuses the data together to form the sensor data 250 and to provide for improved determinations of detection, location, and so on.

At 320, the input module 220 generates a current occupancy map 260 that indicates locations of occupied grid cells as identified by the sensor data 250. The input module 220 analyzes the sensor data 250 in comparison to a grid/coordinate system that defines cells having a particular dimension (e.g., 0.5 m by 0.5 m square) to identify which of the grid cells are free, occupied, and occluded relative to the vehicle 100. For example, in an instance where the sensor data 250 includes a point cloud generated by a LiDAR sensor (e.g., sensor 124), the input module 220 determines whether a cell is occupied according to whether a corresponding point or set of points from the point cloud correlate with the cell. That is, if a return in the point cloud indicates a distance that corresponds with a particular cell, then the input module 220 identifies the cell as being occupied. The particular threshold of points for determining whether the cell is occupied may differ according to, for example, distance, sensor resolution, environmental conditions (e.g., weather), and so on.

In any case, the input module 220 is generally analyzing the sensor data 250 to determine whether the sensor is indicating a perceived object/surface in the location of the cell. Additionally, as previously outlined, the input module 220 may also separately determine whether cells are occluded using ray-tracing or another technique in order to accurately account for all of the grid cells in the occupancy map 260.

At 330, the tracking module 230 updates the difference map 270 according to the current occupancy map 260. As previously noted, the difference map 270 encodes temporal changes in relation to prior states of occupancy of the grid cells to track dynamic objects. The particular process of encoding will be discussed further in relation to FIG. 4 and method 400; however, in general, the tracking module 230 compares the current occupancy grid 260 to the difference map 270 to determine whether values of the grid cells in the current occupancy map 260 are newly occupied, newly free, occluded, and unchanged. The tracking module 230 compares states of the grid cells from an immediately prior timestep as encoded in the difference map 270 with the occupancy map 260. In other words, even though the difference map 270 is focused on encoding temporal changes, the changes nevertheless intrinsically indicate an immediately prior state through tracking that cells are free since an indicated change or are occupied since an indicated change.

Accordingly, based on the comparison, the tracking module 230 identifies temporal changes and encodes the difference map 270 at each time step with the identified changes. In one approach, the tracking module 230 encodes the difference map 270 by identifying respective ones of the grid cells that are newly occupied and newly free with identifiers specifying a change in state. Additionally, for unchanged cells that previously included a temporal change, the tracking module 230 increments an age associated with the temporal change to maintain the temporal indicator about when the change occurred within the difference map 270. As such, the tracking module 230 can use the difference map 270 to indicate evidence of movement in the surrounding environment over multiple data acquisitions.

At 340, the tracking module 230 computes dynamics for the grid cells of the difference map 270. In one embodiment, the tracking module 230 analyzes the temporal changes embodied within the difference map 270 to estimate current velocities. The tracking module 230 may implement a search-based algorithm to group respective ones of the temporal changes that are associated with occupied cells and estimate current velocities for the groups. In general, these groups correspond with objects in the surrounding environment, such as vehicles, pedestrians, etc. Thus, the tracking module 230 can use the algorithm to cluster associated ones of the occupied cells and temporal changes having substantially similar current velocities and positions (i.e., along an inferred path of the object) to estimate current velocities for objects. Thus, in this approach, the tracking module 230 associates the temporal changes with the occupied cells according to spatial relationships and thereby assigns the occupied cells and associated temporal changes to the dynamic objects.

In further approaches, the tracking module 230 implements a machine learning algorithm (i.e., deep neural network such as a convolutional neural network (CNN)), an iterative closest point (ICP) algorithm, or another mechanism for analyzing the difference map 270 to identify consistent and collective evidence of motion from the temporal changes and produce the dynamics. In this way, the tracking module 230 derives the temporal changes at each iteration from the occupancy map 260 and stores the information within the difference map 270 to provide evidence of dynamics without using predefined models (e.g., probabilistic models characterizing movement of different types of objects) to predict motion for the dynamic objects.

At 350, the tracking module 230 predicts positions of the dynamic objects at a subsequent point in time according to the estimated current velocities. That is, the tracking module 230 uses the estimated velocities to determine locations of the objects at subsequent time steps. In further aspects, the tracking module 230 may further predict trajectories (e.g., paths, velocities, and accelerations) using the estimated velocities and other information from the temporal changes (i.e., headings, past movements, etc.).

At 360, the tracking module 230 provides the dynamics to at least one vehicle system within the vehicle 100. For example, in one approach, the tracking module 230 provides the dynamics information (e.g., estimated velocities, estimated positions, future predicted trajectories, etc.) to the autonomous driving module 160. Accordingly, the autonomous driving module 160 may then use the dynamics information to supplement other information about the surrounding environment and improve the operation of the vehicle 100. That is, the autonomous driving module 160 may leverage the dynamics information to supplement and/or verify perceptions derived through other mechanisms and thereby improve obstacle detection/avoidance systems, planning, and so on.

Additionally, the tracking module 230 may provide the current dynamics using various mechanisms. In one embodiment, the tracking module 230 electronically communicates the dynamics over an internal bus, a wireless communication link, or another suitable communication pathway. In any case, the dynamics data produced by the tracking system 170 functions to improve overall situational awareness of receiving systems.

Figure 4:
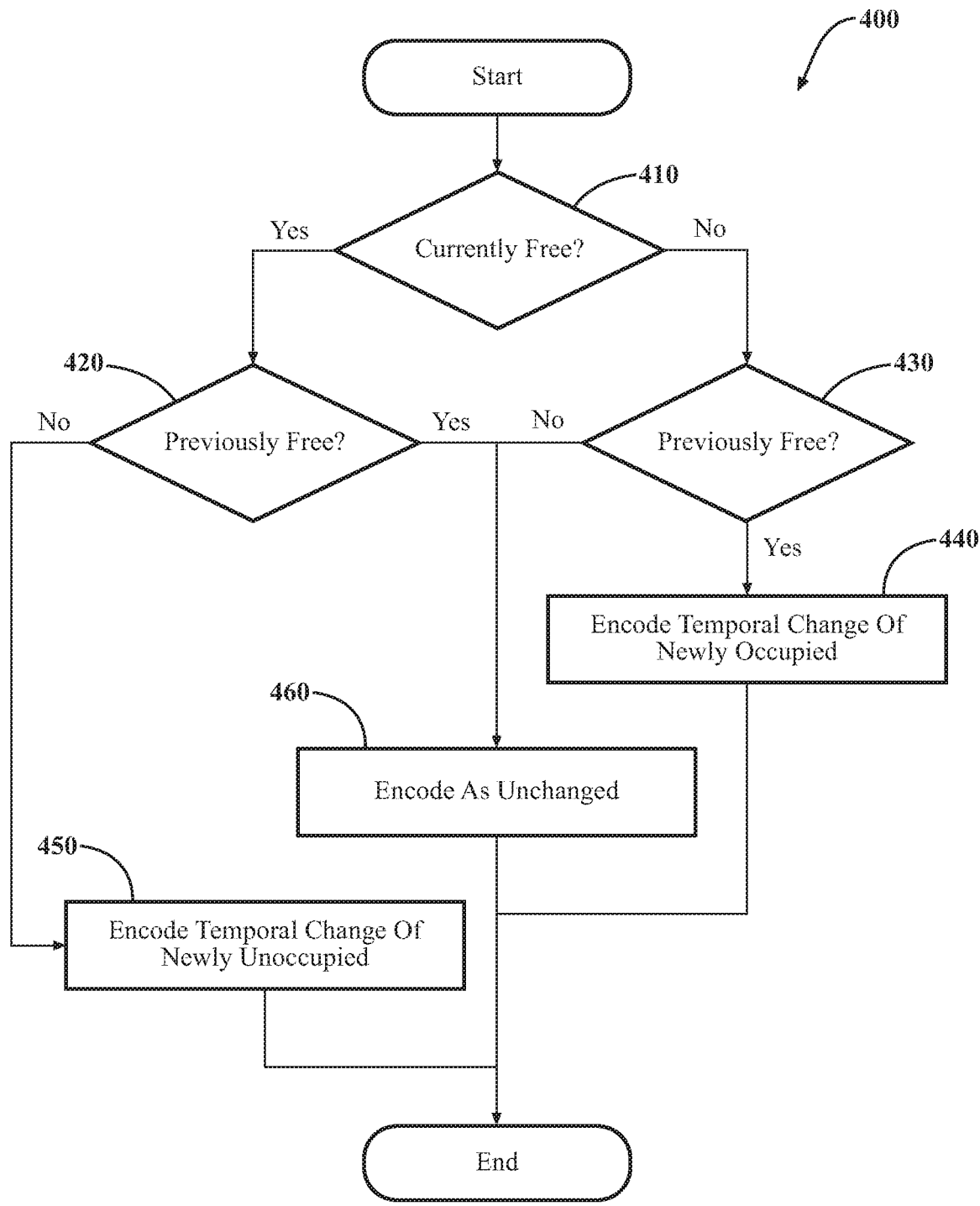
FIG. 4 is a flowchart illustrating one approach to encoding a difference map.

FIG. 4 illustrates one embodiment of a method 400 that is associated with encoding the difference map 270 as discussed more broadly in relation to block 330 of method 300 from FIG. 3. Thus, for purposes of brevity of this discussion, similar elements will not be repeated or re-explained. In a similar fashion as with method 300, method 400 will be discussed from the perspective of the tracking system 170 of FIGS. 1-2. While method 400 is discussed in combination with the tracking system 170, it should be appreciated that the method 400 is not limited to being implemented within the tracking system 170 but is instead one example of a system that may implement the method 400. Moreover, while FIG. 4 illustrates the flowchart of method 400 in a serial manner, it should be appreciated that one or more of the noted functions may execute in parallel.

As an initial note about the method 400, the tracking module 230 is discussed as comparing the current occupancy map 260 with the difference map 270 from the perspective of whether a cell in the occupancy map 260 is currently free. However, it should be appreciated that such a comparison need not occur from the exact perspective shown but may be executed in a transitive manner. In either case, as previously specified, the tracking module 230 registers the occupancy map 260 against the difference map 270 to ensure the mappings are aligned and then compares indicated states to derive subsequent encodings. It should be appreciated that aligning observations from a moving platform such as a vehicle can be a complex task that may involve tracking speeds, localizing the vehicle in the environment, and transforming observations between coordinate systems using various transformations. However, such transformations are not the focus of the present disclosure, and are, thus, generally omitted from further description. In either case, it should be appreciated that the comparison undertaken herein assumes the appropriate alignment of the current occupancy map 260 with the difference map 270 to ensure accurate comparisons. As an additional note, the following description discusses the analysis for a single grid cell but is applied iteratively over the occupancy map 260 to account for the observed cells.

At 410, the tracking module 230 determines whether a grid cell is currently free, as indicated in the current occupancy map 260. As previously discussed, the input module 220 generates the occupancy grid 260 and indicates the cell as being free when the sensor data 250 corresponding to the cell indicates no object is present in the cell (e.g., LiDAR scan passes through the cell without reflecting off an object). If the cell is free, then the comparison continues to block 430, however, if the cell is not free, then the comparison continues to block 440.

At 420, the tracking module 230 references the difference map 270 to determine whether the corresponding cell was previously free in relation to being currently free. If the cell was previously unoccupied/free, then the tracking module 230 encodes the cell as unchanged at 470. If the cell was previously occupied (i.e., not previously free) or occluded/unknown, then the tracking module 230 encodes the temporal change as newly unoccupied, at 460, in relation to the current occupancy map 260.

At 430, the tracking module 230 references the difference map 270 to determine whether the corresponding cell was previously free in relation to now being occupied. If the cell was previously occupied (i.e., not previously free) or occluded/unknown, then the tracking module 230 encodes the cell as unchanged (e.g., increments age or does nothing). If the cell was previously free, then the tracking module 230 proceeds to block 440.

At 440, the tracking module 230 encodes the cell to indicate the movement of an object into the cell (i.e., newly occupied). In this way, the tracking module 230 can indicate when a dynamic object moved into the cell.

At 450, as previously noted, the tracking module 230 encodes a temporal change of newly unoccupied. That is, the cell has changed from being occupied by an object to now being free/unoccupied. A temporal change indicating newly unoccupied generally corresponds with an object moving through the cell.

At 460, the tracking module 230 encodes the respective cells as unchanged. In one embodiment, the tracking module 230 encodes cells as unchanged by, for example, incrementing an age of the cell if the cell includes a prior temporal change or otherwise does nothing to encode the cell. That is, if no previous change exists and the cell is unchanged, then the cell need not carry any explicit information, and, in at least one embodiment, may be left empty or otherwise null thereby conserving memory.

Figure 5:
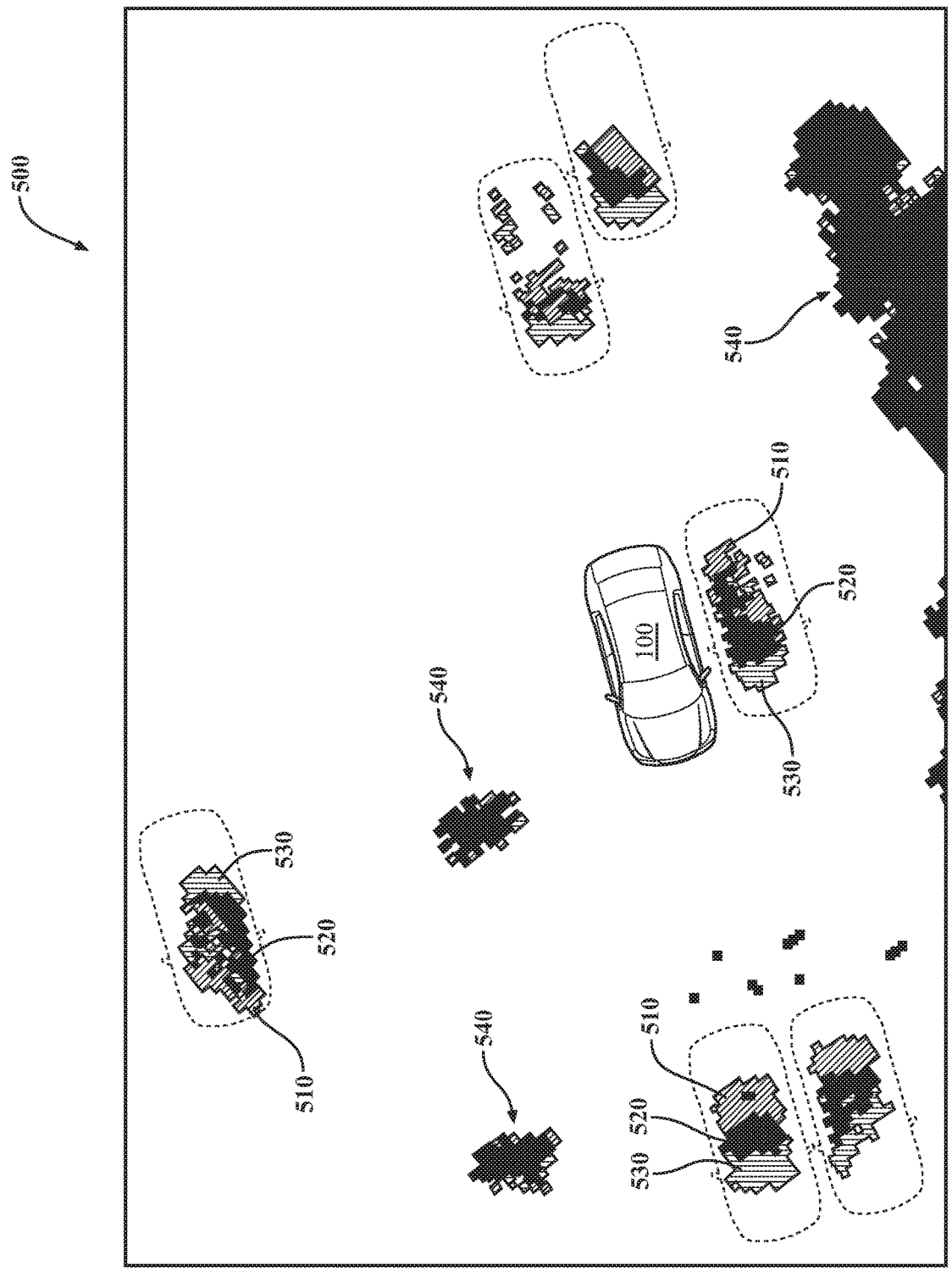
FIG. 5 illustrates one example of a difference map as may be generated by the systems and methods disclosed herein.
Figure 6:
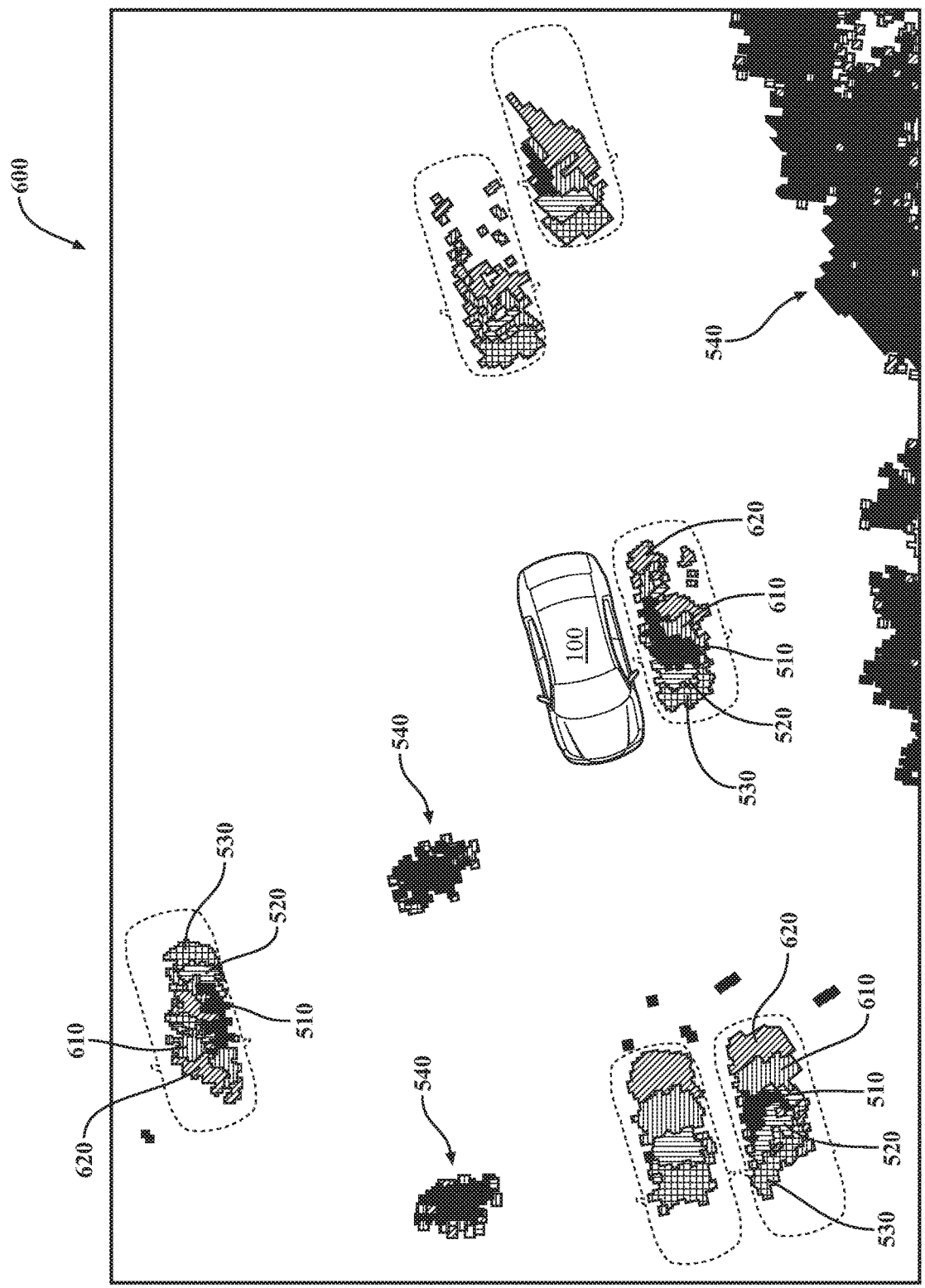
FIG. 6 illustrates another example of a difference map at a subsequent timestep compared to the difference map of FIG. 5.

As a further explanation of how the tracking system 170 encodes the difference map 270, example encodings of the difference map 270 will now be discussed in relation to an example as illustrated in FIGS. 5 and 6. FIG. 5 is a diagram depicting a first encoding 500 of the difference map 270 at a first timestep while FIG. 6 is a diagram depicting a second encoding at a subsequent time step. As shown, the vehicle 100, is observing the surrounding environment and encoding the difference map 270. Iteration 500 of the difference map 270 illustrates sets of encodings 510, 520, and 530. Encoding 510 shows temporal changes for newly occupied cells, encodings 520 show unchanged occupied cells (i.e., previously and currently present), and encodings 530 illustrate newly unoccupied temporal changes. Cell groups 540 generally illustrate inconsistent patterns of the noted encodings and correlate with vegetation or other aspects of the environment that are not moving but instead produce errors/aberrations representing scattered changes in occupancy in the mapping. By contrast, the outlined groupings illustrate encodings consistent with movement over multiple iterations and thus correspond with vehicles moving in the same direction as the vehicle 100.

FIG. 6 illustrates additional encodings 610 and 620 representing forward progress of the objects over separate iterations. Additionally, FIG. 6 also represents changes in the prior temporal encodings resulting in incrementing the ages over iterations.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the tracking system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the tracking system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the tracking system 170, and/or the autonomous driving module(s) 160 may control some or all of these vehicle systems 140 and, thus, may be partially or fully autonomous.

The processor(s) 110, the tracking system 170, and/or the autonomous driving module(s) 160 can be operatively connected to communicate with the various vehicle systems 140 and/or individual components thereof. For example, returning to FIG. 1, the processor(s) 110, the tracking system 170, and/or the autonomous driving module(s) 160 can be in communication to send and/or receive information from the various vehicle systems 140 to control the movement, speed, maneuvering, heading, direction, etc. of the vehicle 100. The processor(s) 110, the tracking system 170, and/or the autonomous driving module(s) 160 may control some or all of these vehicle systems 140.

The processor(s) 110, the tracking system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the tracking system 170, and/or the autonomous driving module(s) 160 can control the direction and/or speed of the vehicle 100. The processor(s) 110, the tracking system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the tracking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A tracking system for tracking dynamic objects in a surrounding environment of a vehicle, comprising:
   one or more processors; and
   a memory communicably coupled to the one or more processors and storing:
      an input module including instructions that when executed by the one or more processors cause the one or more processors to, in response to acquiring sensor data from at least one sensor, generate a current occupancy map that indicates locations of grid cells that are occupied as identified by the sensor data; and
      a tracking module including instructions that when executed by the one or more processors cause the one or more processors to update a difference map according to the current occupancy map, wherein the difference map encodes temporal changes in relation to prior states of occupancy of the grid cells to track dynamic objects in the surrounding environment over a defined temporal horizon, and
   wherein the tracking module includes instructions to compute dynamics of the dynamic objects according to the difference map, including instructions to estimate current velocities of occupied cells of the grid cells and clustering associated ones of the occupied cells with substantially similar current velocities and positions.

2. The tracking system of claim 1, wherein the tracking module includes instructions to update the difference map including instructions to identify changes in occupancy of one or more of the grid cells by comparing the current occupancy map to the difference map to determine whether values for the grid cells in the current occupancy map are one of: newly occupied, newly free, occluded, and unchanged, and wherein the tracking module includes instructions to compare the difference map with the current occupancy map including instructions to compare a set of the grid cells encoded in the difference map from a prior time step.

3. The tracking system of claim 1, wherein the tracking module includes instructions to update the difference map including instructions to encode the difference map with temporal changes in an occupancy of the grid cells according to observations of the at least one sensor, wherein the tracking module includes instructions to encode the difference map including instructions to i) identify respective ones of the grid cells that are newly occupied and newly free with identifiers specifying a change in state and an age, and ii) increment the age for previously changed ones of the grid cells to maintain a temporal encoding for the temporal changes, and wherein the temporal changes are indicative of movement of the dynamic objects out to the temporal horizon.

4. The tracking system of claim 1, wherein the tracking module includes instructions to estimate the current velocities including instructions to associate the temporal changes with the occupied cells according to spatial relationships, and wherein the tracking module includes instructions to cluster the occupied cells to assign the occupied cells to the dynamic objects.

5. The tracking system of claim 1, wherein the tracking module includes instructions to compute the dynamics including instructions to analyze the temporal changes embodied within the difference map to estimate current velocities using a search-based algorithm that groups respective ones of the temporal changes that are associated with occupied cells, and wherein the tracking module includes instructions to compute the dynamics further include instructions to predict positions of the dynamic objects at a subsequent point in time according to the current velocities.

6. The tracking system of claim 1, wherein the at least one sensor is a light detection and ranging (LiDAR) sensor, wherein the input module includes instructions to acquire the sensor data from at least one sensor including instructions to control the LiDAR sensor to iteratively scan the surrounding environment to provide the sensor data at successive time steps, and wherein the input module includes instructions to generate the current occupancy map including instructions to identify, using the sensor data, which of the grid cells are free, occupied, and occluded relative to the vehicle.

7. The tracking system of claim 1, wherein the tracking module further includes instructions to provide the dynamics to at least one vehicle system within the vehicle.

8. The tracking system of claim 7, wherein the tracking module further includes instructions to provide the dynamics including instructions to electronically communicate the dynamics to at least one system in the vehicle to improve situational awareness of the system about the dynamic objects, and wherein the tracking module further includes instructions to compute the dynamics based, at least in part, on the temporal changes without using a predefined model characterizing movement of the dynamic objects.

9. A non-transitory computer-readable medium for tracking dynamic objects in a surrounding environment of a vehicle and including instructions that when executed by one or more processors cause the one or more processors to:

in response to acquiring sensor data from at least one sensor, generate a current occupancy map that indicates locations of grid cells that are occupied as identified by the sensor data;

update a difference map according to the current occupancy map, wherein the difference map encodes temporal changes in relation to prior states of occupancy of the grid cells to track dynamic objects in the surrounding environment over a defined temporal horizon;

compute dynamics of the dynamic objects according to the difference map, including instructions to estimate current velocities of occupied cells of the grid cells and clustering associated ones of the occupied cells with substantially similar current velocities and positions; and provide the dynamics to at least one vehicle system within the vehicle.

10. The non-transitory computer-readable medium of claim 9, wherein the instructions to update the difference map include instructions to identify changes in occupancy of one or more of the grid cells by comparing the current occupancy map to the difference map to determine whether values for the grid cells in the current occupancy map are one of: newly occupied, newly free, occluded, and unchanged, and wherein the instructions to compare the difference map with the current occupancy map include instructions to compare a set of the grid cells encoded in the difference map from a prior time step.

11. The non-transitory computer-readable medium of claim 9, wherein the instructions to update the difference map include instructions to encode the difference map with temporal changes in an occupancy of the grid cells according to observations of the at least one sensor, wherein the instructions to encode the difference map include instructions to i) identify respective ones of the grid cells that are newly occupied and newly free with identifiers specifying a change in state and an age, and ii) increment the age for previously changed ones of the grid cells to maintain a temporal encoding for the temporal changes, and wherein the temporal changes are indicative of movement of the dynamic objects out to the temporal horizon.

12. The non-transitory computer-readable medium of claim 9, wherein the instructions to estimate the current velocities include instructions to associate the temporal changes with the occupied cells according to spatial relationships, and wherein the instructions to cluster the occupied cells assign the occupied cells to the dynamic objects.

13. The non-transitory computer-readable medium of claim 9, wherein the instructions to compute the dynamics include instructions to analyze the temporal changes embodied within the difference map to estimate current velocities using a search-based algorithm that groups respective ones of the temporal changes that are associated with occupied cells, and wherein computing the dynamics further includes predicting positions of the dynamic objects at a subsequent point in time according to the current velocities.

14. A method comprising:
  generating a current occupancy map that indicates locations of grid cells that are occupied as identified by sensor data from at least one sensor;
  updating a difference map according to the current occupancy map, wherein the difference map encodes temporal changes in relation to prior states of occupancy of the grid cells to track dynamic objects in a surrounding environment over a defined temporal horizon;
  computing dynamics of the dynamic objects according to the difference map by estimating current velocities of occupied cells of the grid cells and clustering associated ones of the occupied cells with substantially similar current velocities and positions; and
  providing the dynamics to at least one vehicle system within the vehicle.

15. The method of claim 14, wherein updating the difference map includes identifying changes in occupancy of one or more of the grid cells by comparing the current occupancy map to the difference map to determine whether values of the grid cells in the current occupancy map are one of: newly occupied, newly free, occluded, and unchanged, and
  wherein comparing the difference map with the current occupancy map includes comparing a set of the grid cells encoded in the difference map from an immediately prior time step.

16. The method of claim 14, wherein updating the difference map includes encoding the difference map with temporal changes in an occupancy of the grid cells according to observations of the at least one sensor,
  wherein encoding the difference map includes i) identifying respective ones of the grid cells that are newly occupied and newly free with identifiers specifying a change in state and an age, and ii) incrementing the age for previously changed ones of the grid cells to maintain a temporal encoding for the temporal changes, and wherein the temporal changes are indicative of movement of the dynamic objects out to the temporal horizon.

17. The method of claim 14,
  wherein estimating the current velocities includes associating the temporal changes with the occupied cells according to spatial relationships, and
  wherein clustering assigns the occupied cells to the dynamic objects.

18. The method of claim 14, wherein computing the dynamics includes analyzing the temporal changes embodied within the difference map to estimate current velocities using a search-based algorithm that groups respective ones of the temporal changes that are associated with occupied cells, and
  wherein computing the dynamics further includes predicting positions of the dynamic objects at a subsequent point in time according to the current velocities.

19. The method of claim 14, wherein the at least one sensor is a light detection and ranging (LiDAR) sensor, wherein acquiring the sensor data from at least one sensor includes controlling the LiDAR sensor to iteratively scan the surrounding environment to provide the sensor data at successive time steps, and
  wherein generating the current occupancy map includes using the sensor data to identify which of the grid cells are free, occupied, and occluded relative to the vehicle.

20. The method of claim 14, wherein providing the dynamics includes electronically communicating the dynamics to at least one system in the vehicle to improve situational awareness of the system about the dynamic objects, and
  wherein computing the dynamics is based, at least in part, on the temporal changes without using a predefined model characterizing movement of the dynamic objects.

* * * * *